United States Patent
Marupaduga et al.

(10) Patent No.: US 10,123,248 B1
(45) Date of Patent: Nov. 6, 2018

(54) WIRELESS ACCESS POINT CONTROL OF POWER AMPLIFIERS BASED ON AN ENCLOSURE TEMPERATURE

(71) Applicant: Sprint Communications Company L.P., Overland Park, KS (US)

(72) Inventors: Sreekar Marupaduga, Overland Park, KS (US); Andrew Mark Wurtenberger, Olathe, KS (US); Patrick J. Schmidt, Bonner Springs, KS (US); Martin D. Zeller, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/604,379

(22) Filed: May 24, 2017

(51) Int. Cl.
| | | |
|---|---|---|
| *H04W 72/00* | (2009.01) | |
| *H04W 36/22* | (2009.01) | |
| *H04W 28/08* | (2009.01) | |
| *H04W 72/04* | (2009.01) | |
| *H04W 52/52* | (2009.01) | |
| *H04W 52/26* | (2009.01) | |
| *H04W 36/06* | (2009.01) | |

(52) U.S. Cl.
CPC ......... *H04W 36/22* (2013.01); *H04W 28/085* (2013.01); *H04W 36/06* (2013.01); *H04W 52/267* (2013.01); *H04W 52/52* (2013.01); *H04W 72/048* (2013.01); *H04W 72/0453* (2013.01)

(58) Field of Classification Search
USPC ................. 455/127.1, 67.14; 370/329; 1/1; 375/220
See application file for complete search history.

(56) References Cited

U.S. PATENT DOCUMENTS

| | | | |
|---|---|---|---|
| 5,801,632 A | 9/1998 | Opal | |
| 6,084,772 A | 7/2000 | Pell et al. | |
| 6,462,949 B1 | 10/2002 | Parish, IV et al. | |
| 8,781,409 B2 | 7/2014 | Peng et al. | |
| 9,380,594 B1* | 6/2016 | Malmirchegini | H04W 72/10 |
| 2008/0279264 A1* | 11/2008 | Desai | H04W 16/14 375/220 |
| 2010/0327968 A1* | 12/2010 | Guemes Cabrejas | H03F 1/52 330/2 |
| 2013/0050939 A1 | 2/2013 | Burke et al. | |

(Continued)

FOREIGN PATENT DOCUMENTS

| | | |
|---|---|---|
| GB | 2289827 | 11/1995 |
| JP | 2015088835 A * | 5/2015 |
| WO | 2016094495 | 6/2016 |

*Primary Examiner* — David Q Nguyen (57) ABSTRACT

A wireless access point to dynamically controls power amplifiers. The wireless access point wirelessly exchanges media communications using a plurality of frequency bands. The wireless access point monitors an internal temperature in an enclosure and determines that the internal temperature is above a temperature threshold. The wireless access point monitors traffic loading on each of the plurality of frequency bands exchanging media communications and selects a frequency band with a low traffic level. The wireless access point redirects the media communications to a frequency band having a higher traffic loading level and disables a power amplifier associated with the selected frequency band having the low traffic loading level.

20 Claims, 8 Drawing Sheets

(56) References Cited

U.S. PATENT DOCUMENTS

| | | | |
|---|---|---|---|
| 2013/0288610 A1* | 10/2013 | Toh | H03G 3/3042 |
| | | | 455/67.14 |
| 2014/0024325 A1* | 1/2014 | Iun | H04B 7/0408 |
| | | | 455/127.1 |
| 2015/0338859 A1* | 11/2015 | Lei | H04W 52/0206 |
| | | | 700/299 |
| 2016/0233838 A1* | 8/2016 | Park | H03F 1/42 |
| 2017/0026136 A1* | 1/2017 | Thompson | H04B 1/006 |
| 2018/0027356 A1* | 1/2018 | Chen | H04W 4/005 |
| | | | 370/329 |

* cited by examiner

| FREQ BAND | FREQ CHANNEL | LOADING | POWER AMP | ACTIVATION STATUS |
|---|---|---|---|---|
| BAND 1 | CH – 1.1 | HIGH | PA - A | ENABLE |
|  | CH – 1.2 | HIGH | PA - B | ENABLED |
| BAND 2 | CH – 2.1 | MEDIUM | PA - B | ENABLED |
|  | CH – 2.2 | LOW | PA - C | DISABLE |
|  | CH – 2.3 | MEDIUM | PA - A | ENABLED |
| BAND 3 | CH – 3.1 | LOW | PA - D | DISABLE |
|  | CH – 3.2 | LOW | PA - C | DISABLE |

FIGURE 7

Figure 1:
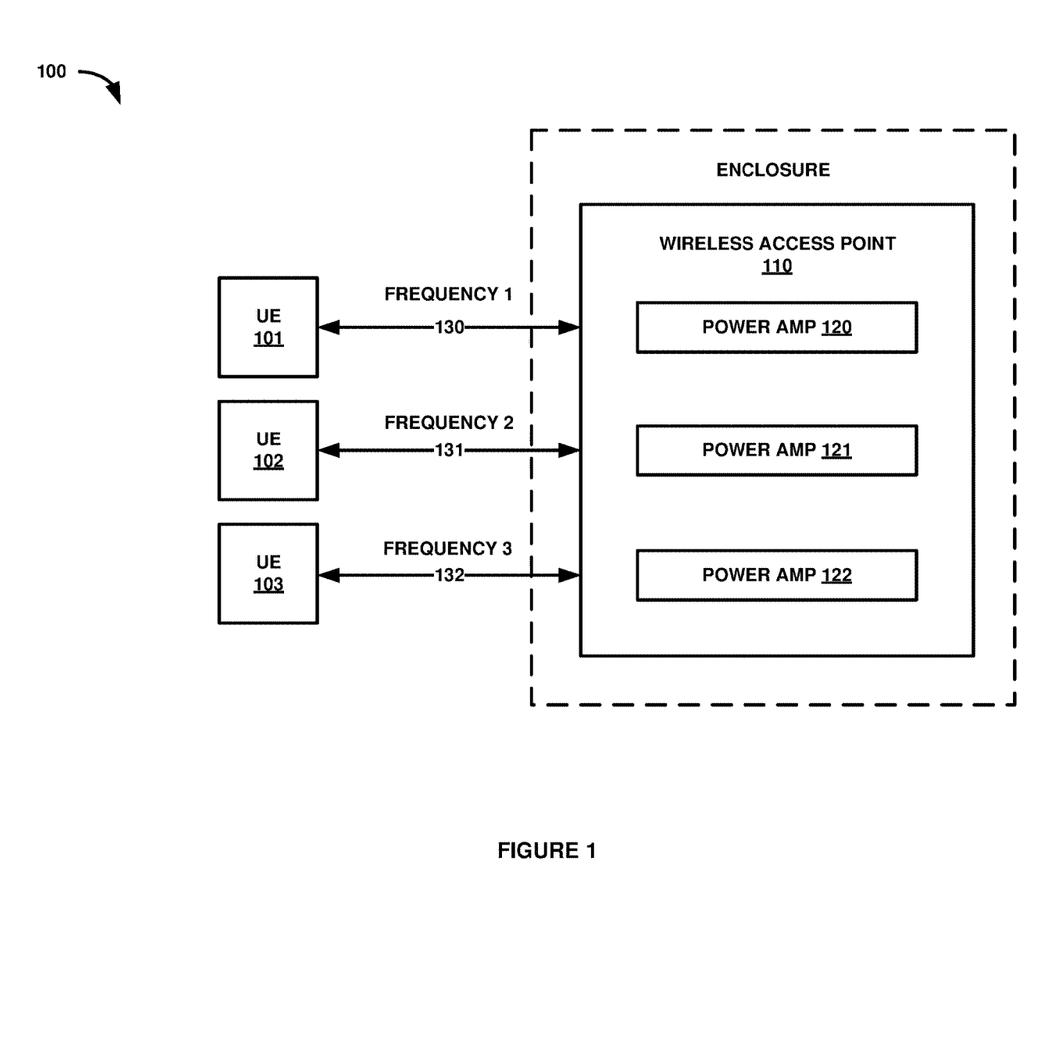
FIGS. 1-2 illustrates a wireless communication system to dynamically control power amplifiers.

FIGURE 8 ature in an enclosure and determines that the internal temperature is above a temperature threshold. The enclosure conceals wireless access point 110 and may be used for a variety of reasons, such as aesthetics, public safety, equipment protection from weather or other environmental hazards, and the like. The enclosure retains heat created by power amplifiers 120-122 inside wireless access point 110 which may lead the temperature inside the enclosure to rise. This rise in temperature may damage hardware located within wireless access point 110. Wireless access point 110 may monitor the internal temperature of the enclosure determining a thermal coefficient or temperature, and compare the current thermal coefficient or temperature to a thermal coefficient or temperature threshold.

WIRELESS ACCESS POINT CONTROL OF POWER AMPLIFIERS BASED ON AN ENCLOSURE TEMPERATURE

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

To expand or enhance the wireless signal coverage of a wireless communication network, wireless small cells may be added to locations not adequately covered by current network infrastructure. Wireless small cells could be a wireless microcell, picocell, femtocell, repeater, and the like. The wireless small cell transmits and receives wireless signals exchanged between UEs and a wireless macrocell. The wireless small cell typically includes a shroud to conceal the wireless small cell. The shroud may be used for a variety of reasons, such as aesthetics, public safety, equipment protection from weather or other environmental hazards, and the like.

Although shrouds allow for concealment and protection of the wireless small cell, the heat rises inside the shroud due to the power amplifiers of the wireless small cell. This rise in temperature could damage hardware located within the wireless small cell. While cooling systems may cool the wireless small cell, these methods are typically resource intensive, draw additional attention to the shroud, and can be limited in space and design. Therefore, current methods for reducing heat within a shroud concealing a wireless small cell are inefficient and an alternative technique is needed.

TECHNICAL OVERVIEW

A wireless access point dynamically controls power amplifiers. The wireless access point wirelessly exchanges media communications using a plurality of frequency bands. The wireless access point monitors an internal temperature in an enclosure and determines that the internal temperature is above a temperature threshold. The wireless access point monitors traffic loading on each of the plurality of frequency bands exchanging media communications and selects a frequency band with a low traffic level. The wireless access point redirects the media communications to a frequency band having a higher traffic loading level and disables a power amplifier associated with the selected frequency band having the low traffic loading level.

DETAILED DESCRIPTION

Figure 2:
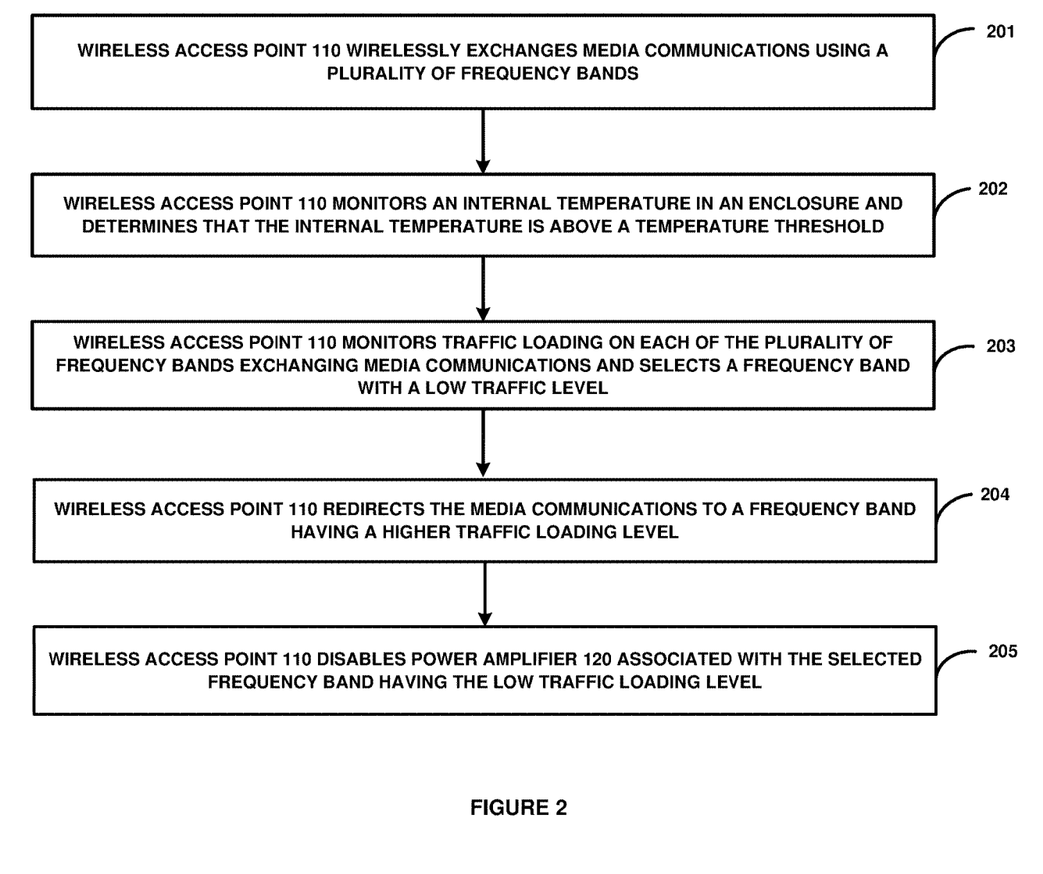

FIGS. 1-2 illustrate a wireless communication system to dynamically control power amplifiers. Referring to FIG. 1, wireless communication system 100 comprises User Equipment (UEs) 101-103 and wireless access point 110. Wireless access point 110 is located inside of an enclosure (as indicated by the dashed-lines) and comprises power amplifiers 120-122. UEs 101-103 communicate with wireless access point 110 over wireless links 130-132 which are each associated with a frequency band.

UEs 101-103 could each be a phone, tablet computer, media device, an intelligent machine, or some other apparatus having a wireless transceiver. UEs 101-103 include processing circuitry and memory that store and execute various software modules. UEs 101-103 may wirelessly receive and transmit Radio Resource Control (RRC) signaling to attach, request services, and exchange data with wireless access point 110 using various frequency bands.

Wireless access point 110 may comprise a macro base station, a micro base station, a picocell base station, a femtocell base station, a wireless hotspot, an evolved NodeB (eNodeB), wireless repeater, wireless relay, or some other wireless access point that may provide wireless communication services to UEs 101-103. Wireless access point 110 includes communication transceivers comprising antennas, amplifiers, modulators, filers, and digital signal processors. Wireless access point 110 also includes data processing circuitry, memory, and operating software to control the transceivers and server network applications. Wireless access point 110 uses RRC signaling to perform UE attachment, schedule services, and exchange data with UEs 101-103 using various frequency bands.

Wireless communication links 130-132 use air or space as the transport media. Wireless communication links 130-132 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), High Speed Packet Access (HSPA), or some other wireless communication format—including combinations thereof.

In operation, wireless access point 110 wirelessly exchanges media communications using a plurality of frequency bands. Media communications typically include internet access, voice calls, media streaming, user messaging, among other communication services.

Wireless access point 110 monitors an internal temperature in an enclosure and determines that the internal temperature is above a temperature threshold. The enclosure conceals wireless access point 110 and may be used for a variety of reasons, such as aesthetics, public safety, equipment protection from weather or other environmental hazards, and the like. The enclosure retains heat created by power amplifiers 120-122 inside wireless access point 110 which may lead the temperature inside the enclosure to rise. This rise in temperature may damage hardware located within wireless access point 110. Wireless access point 110 may monitor the internal temperature of the enclosure determining a thermal coefficient or temperature, and compare the current thermal coefficient or temperature to a thermal coefficient or temperature threshold.

Wireless access point 110 monitors traffic loading on each of the plurality of frequency bands exchanging media communications and selects a frequency band with a low traffic level. Wireless access point 110 may monitor traffic loading on each frequency band by determining a number of UEs exchanging data over each frequency band, a number of data bearers allocated to each frequency band, a number of data packets flowing over each frequency band, or some other traffic loading measurement determined on a per frequency band basis.

Wireless access point 110 redirects the media communications to a frequency band having a higher traffic loading level and disables power amplifier 120 associated with the selected frequency band having the low traffic loading level. Wireless access point 110 may redirect the media communications to a frequency band having a higher traffic loading level by determining the frequency band with the frequency band having the next lowest traffic loading level and allocating resources used on the frequency band having the lowest traffic loading to the frequency band having the next lowest traffic loading level. This would allow power amplifier 120 associated with the frequency band having the lowest traffic loading level to be disabled without overloading frequency bands with high traffic loading levels.

Wireless access point 110 may also redirect the media communications to a frequency band having a higher traffic loading level by determining the frequency band with the highest loading level and allocating resources used on the frequency band with the lowest traffic loading level to the frequency band with the highest traffic loading level. This would maximize utilization of the power amplifiers associated with frequency bands having the highest traffic loading levels and not excessively redirect resources on the frequency bands with the lower traffic loading levels when multiple power amplifiers are enabled and disabled.

In some examples, wireless access point 110 may further monitor the internal temperature and determine that the internal temperature is below the temperature threshold. In this example, wireless access point 110 would then enable power amplifier 120 associated with the selected frequency band that had previously had the low traffic loading level. For example, in response to disabling power amplifier 120, the temperature within the enclosure may cool-off enough for wireless access point 110 to enable power amplifier 120 to exchange additional traffic.

In some examples, wireless access point 110 selects the frequency band with the low traffic level by selecting multiple frequency bands with low traffic levels. In other examples, disabling the power amplifier associated with the selected frequency band having the low traffic loading level comprises disabling multiple power amplifiers associated with the selected frequency band having the low traffic loading level. For example, multiple frequency bands may be associated with multiple power amplifiers 120-122. Therefore, disabling power amplifiers 120-122 may require redirecting media communications on various frequency bands before a combination of power amplifiers 120-122 may be disabled.

In some examples, selecting the frequency band with the low traffic level comprises selecting a frequency band having a lower propagation characteristic. In this example, redirecting the media communications to the frequency band having the high traffic loading level comprises redirecting the media communications to a frequency band having a higher propagation characteristic, and disabling power amplifier 120 associated with the selected frequency band having the low traffic level comprises disabling the power amplifier associated with the selected frequency band having the lower propagation characteristic.

In other examples, wireless access point 110 selects the frequency band with the low traffic level by selecting a frequency band having a lower frequency bandwidth. In this example, wireless access point 110 would then redirect the media communications to a frequency band having a higher frequency bandwidth and disable the power amplifier associated with the selected frequency band having the lower frequency bandwidth.

In some examples, wireless access point 110 selects the frequency band with the low traffic level by selecting a frequency channel having a low traffic level. In this example, wireless access point 110 redirects the media communications to the frequency band having the high traffic loading level by redirecting the media communications to a frequency channel having a high traffic loading level, and disabling the power amplifier associated with the selected frequency channel having the high traffic loading level.

In other examples, wireless access point 110 selects the frequency band with the low traffic level by selecting a Radio Frequency (RF) transceiver having a low traffic level. In this example, wireless access point 110 redirects the media communications to a RF transceiver having a high traffic level and disables the power amplifier associated with the selected RF transceiver having the low traffic level.

FIG. 2 is a flow diagram illustrating an operation of a wireless communication system to dynamically control power amplifiers. Wireless access point 110 wirelessly exchanges (201) media communications using a plurality of frequency bands. Wireless access point 110 monitors (202) an internal temperature in an enclosure and determines (202) that the internal temperature is above a temperature threshold. Wireless access point 110 monitors (203) traffic loading on each of the plurality of frequency bands exchanging media communications and selects a frequency band with a low traffic level. Wireless access point 110 redirects (204) the media communications to a frequency band having a high traffic loading level. Wireless access point 110 then disables (205) power amplifier 120 associated with the selected frequency band having the low traffic loading level.

Figure 3:
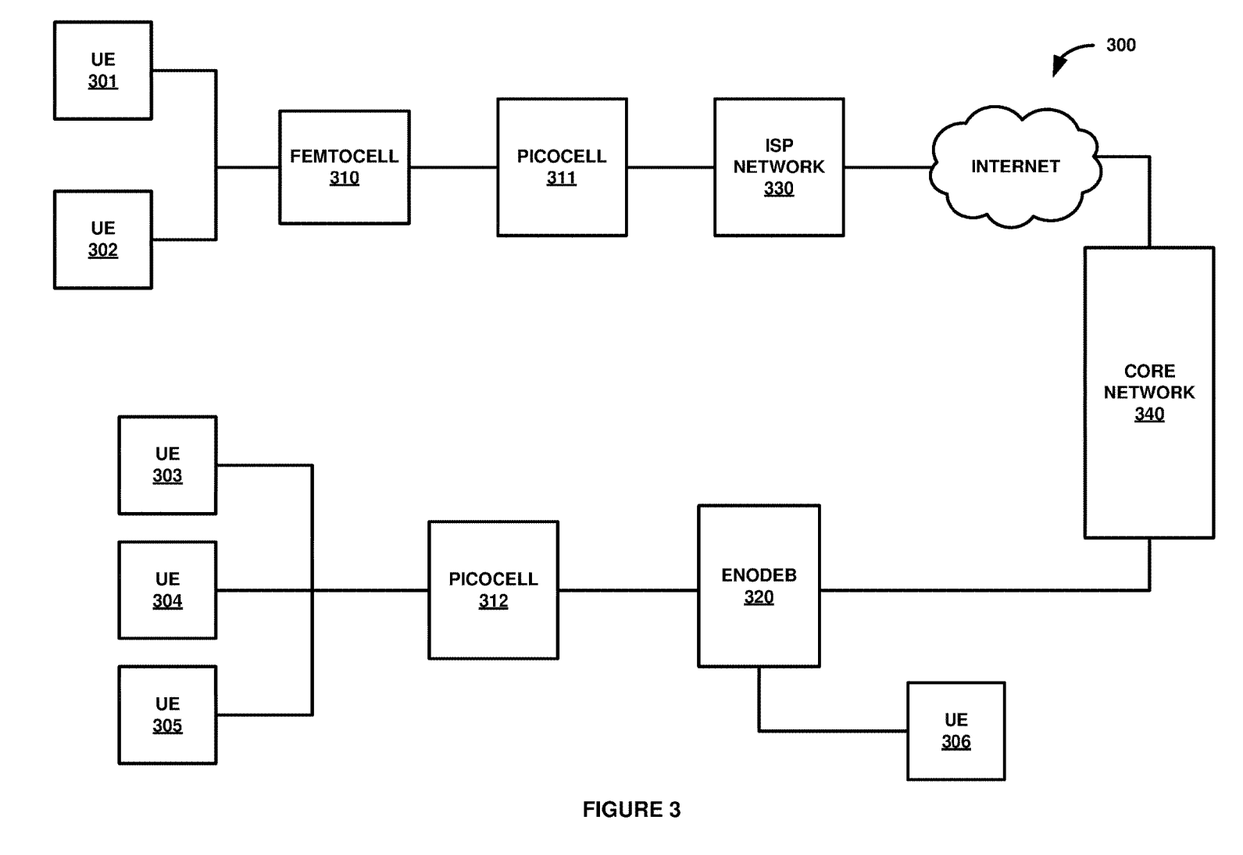
FIGS. 3-5 illustrate a wireless communication system to dynamically control power amplifiers.

FIG. 3 illustrates wireless communication system 300 to dynamically control power amplifiers. Wireless communication system 300 is an example of wireless communication system 100, although wireless communication system 100 may use alternative configurations and operations. Wireless communication system 300 comprises UEs 301-306, wireless femtocell 310, wireless picocells 311-312, eNodeB 320, Internet Service Provider (ISP) network 330, and core network 340. UEs 301-302 exchange signaling and data with core network 340 over wireless femtocell 310, wireless picocell 311, ISP network 330, and the internet. UEs 303-305 exchange signaling and data with core network 340 over wireless picocell 312 and eNodeB 320. UE 306 exchanges signaling and data with core network 340 over eNodeB 320.

Figure 4:
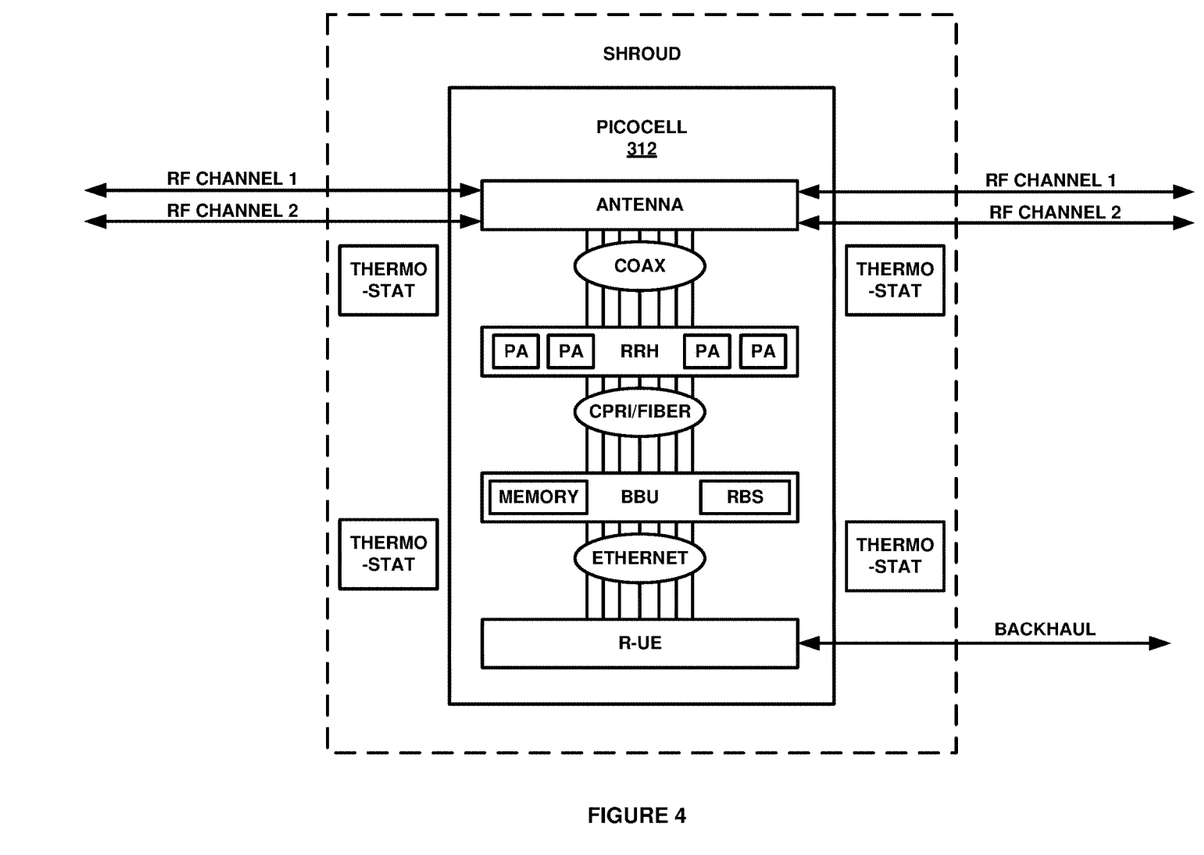

FIG. 4 illustrates wireless picocell 312 contained within wireless communication system 300. As indicated by the dashed-lines, wireless picocell 312 is located inside a shroud in which the shroud contains thermostats in various locations. Wireless picocell 312 contains an antenna system, a Remote Radio Head (RRH), a Baseband Unit (BBU), and a Relay UE (R-UE). The antenna system exchanges signaling and data using multiple frequency bands, such as RF channel 1 and RF channel 2. Although not shown, antenna system contains RF transceivers to communicate using each of the RF channels. Antenna system communicates with the RRH over the coaxial cable.

The RRH contains multiple power amplifiers. It should be noted that each power amplifier may be associated with various RF channels. The RRH communicates with the BBU using a Common Public Radio Interface (CPRI). The BBU contains memory and a resource block scheduler to redirect media communications from an RF channel having a low traffic loading level to an RF channel having a higher traffic loading level. The BBU communicates with the R-UE over an Ethernet link. The R-UE exchanges backhaul signaling and data.

Figure 5:
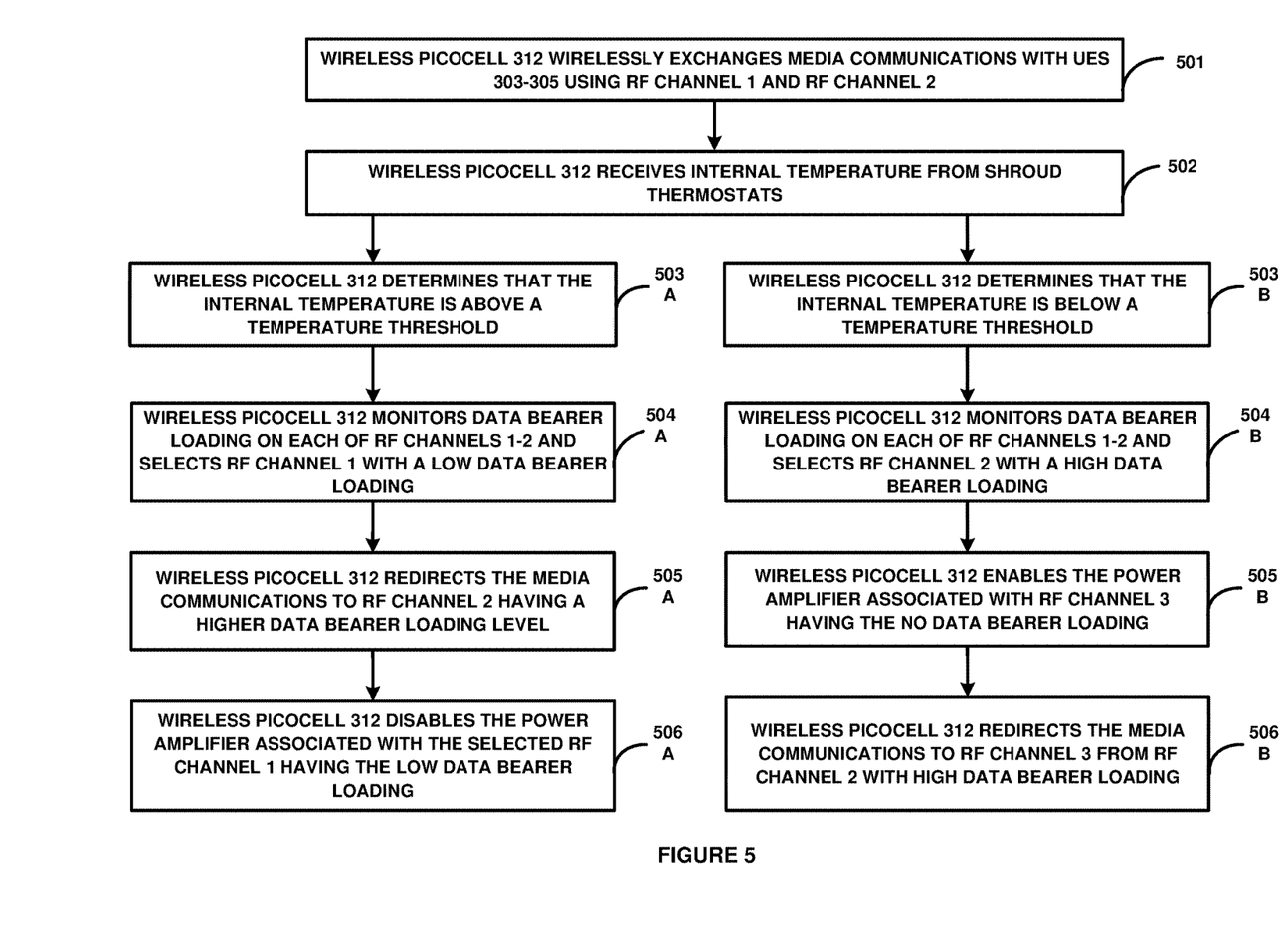

FIG. 5 illustrates an operation of wireless communication system 300 to dynamically control power amplifiers. In operation, wireless picocell 312 wirelessly exchanges (501) media communications with UEs 303-305 using RF channel 1 and RF channel 2. Wireless picocell 312 then monitors an internal temperature of the shroud by receiving (502) current temperature readings from the various internal thermostats.

Following path A, wireless picocell 312 determines (503-A) that the internal temperature is above a temperature threshold. Wireless picocell 312 also monitors (504-A) data bearer loading on each of RF channel 1 and RF channel 2 exchanging media communications and selects (504-A) RF channel 1 having a low data bearer loading level. Wireless picocell 312 then redirects (505-A) the media communication to RF channel 1 having a higher data bearer loading level. In a final operation, wireless picocell 312 disables (506-A) the power amplifier associated with selected RF channel 1 having the low data bearer loading level.

Following path B, wireless picocell 312 determines (503-B) that the internal temperature is below a temperature threshold. Wireless picocell 312 also monitors (504-B) data bearer loading on each of RF channel 1 and RF channel 2 exchanging media communications and selects (504-B) RF channel 2 having a high data bearer loading level. Wireless picocell 312 then enables (505-B) the power amplifier associated with RF channel 3 having no data bearer loading. In a final operation, wireless picocell 312 redirects (506-B) the media communication from RF channel 2 having a high data bearer loading level to RF channel 3 having no data bearer loading.

Figure 6:
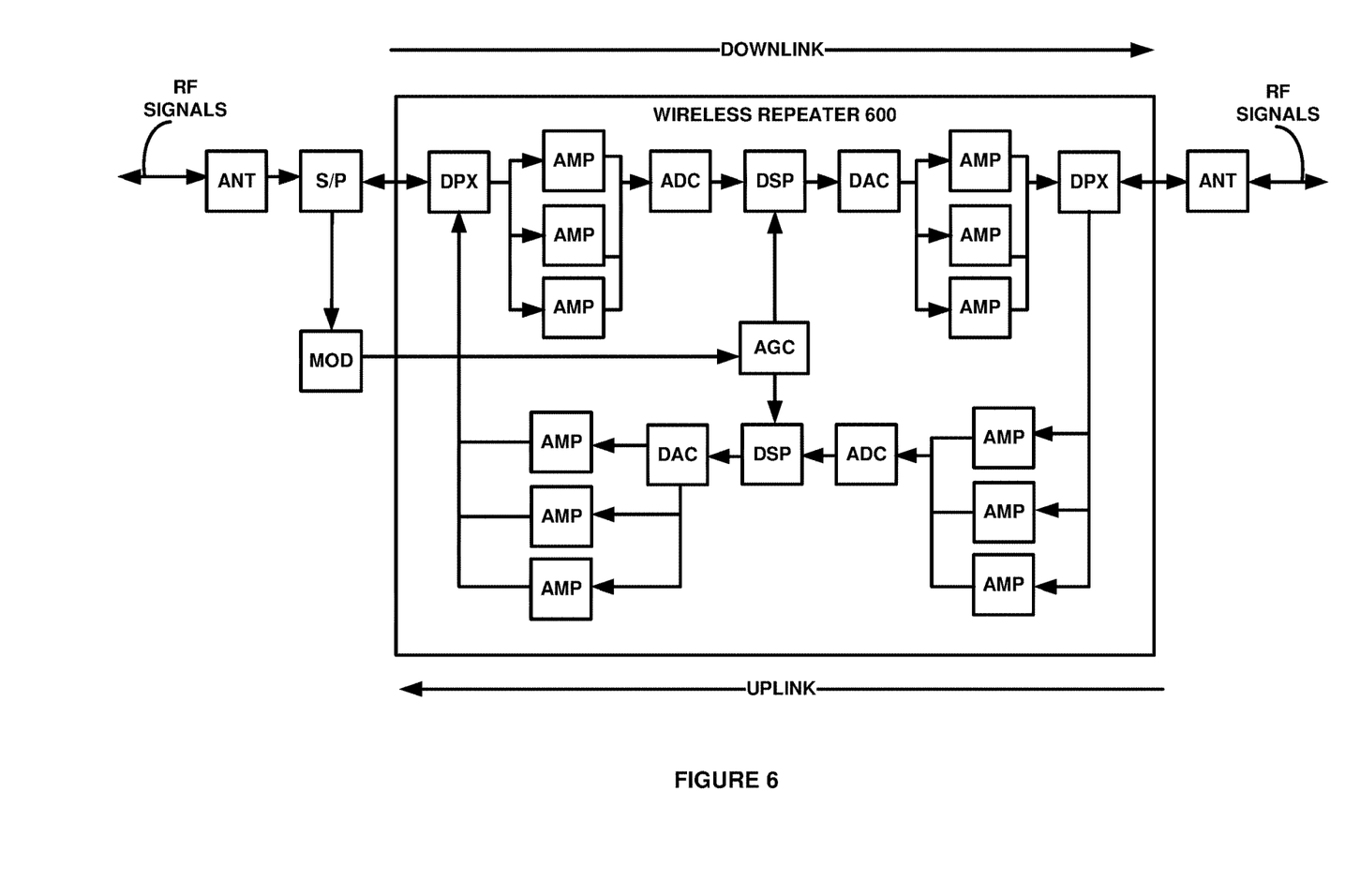
FIG. 6 illustrates a wireless repeater to dynamically control power amplifiers.

FIG. 6 illustrates wireless repeater 600 to dynamically control power amplifiers. Wireless repeater 600 is an example of wireless access point 110 and wireless picocells 311-312, although wireless access point 110 and wireless picocells 311-312 may use alternative configurations and operations. Wireless repeater 600 includes RF signals with multiple frequency components, antenna systems, Automatic Gain Control (AGC) systems, a splitter (S/P), and a modem (MOD). Wireless repeater 600 also includes duplexers (DPX), amplifiers (AMP), analog-to-digital converters (ADC), digital signaling processing systems (DSP), and digital-to-analog converters (DAC).

In operation, RF signals that comprise multiple frequency components are input into wireless repeater 600. RF signals may be uplink signals, downlink signals, or synthetic signals inserted by wireless picocells 600, received from another wireless picocell, a UE, a wireless femtocell, or any other type wireless base station. The RF signals are then delivered to the splitter, which splits the RF signals and transfers the split RF signals to a modem and a duplexer. The duplexer transfers the RF signals and the target RF signals to the multiple amplifiers.

At this point in the process, RF signals are transferred to an analog-to-digital converter by the amplifiers and the converter transfers the converted RF signals to a DSP. The DPS processes frequency responses and determines frequency gains. The DPS can also apply received frequency gains. After processing, the RF signals are transferred to a digital-to-analog convertor, which converts the RF signals and transfers the converted RF signals to additional amplifiers.

The amplifiers then transfer the RF signals to a duplexer that transfers the RF signals to another antenna system. Downlink RF signals go from left to right and uplink RF signals go from right to left. The modem transfers the RF signals to the other AGC, which processes the RF signals and determines whether to apply AGC. The other AGC then transfers AGC instructions to the wireless signal processors, as needed. In some examples, the same AGC instruction is sent to the wireless signal processors in both the downlink and uplink.

Figure 7:
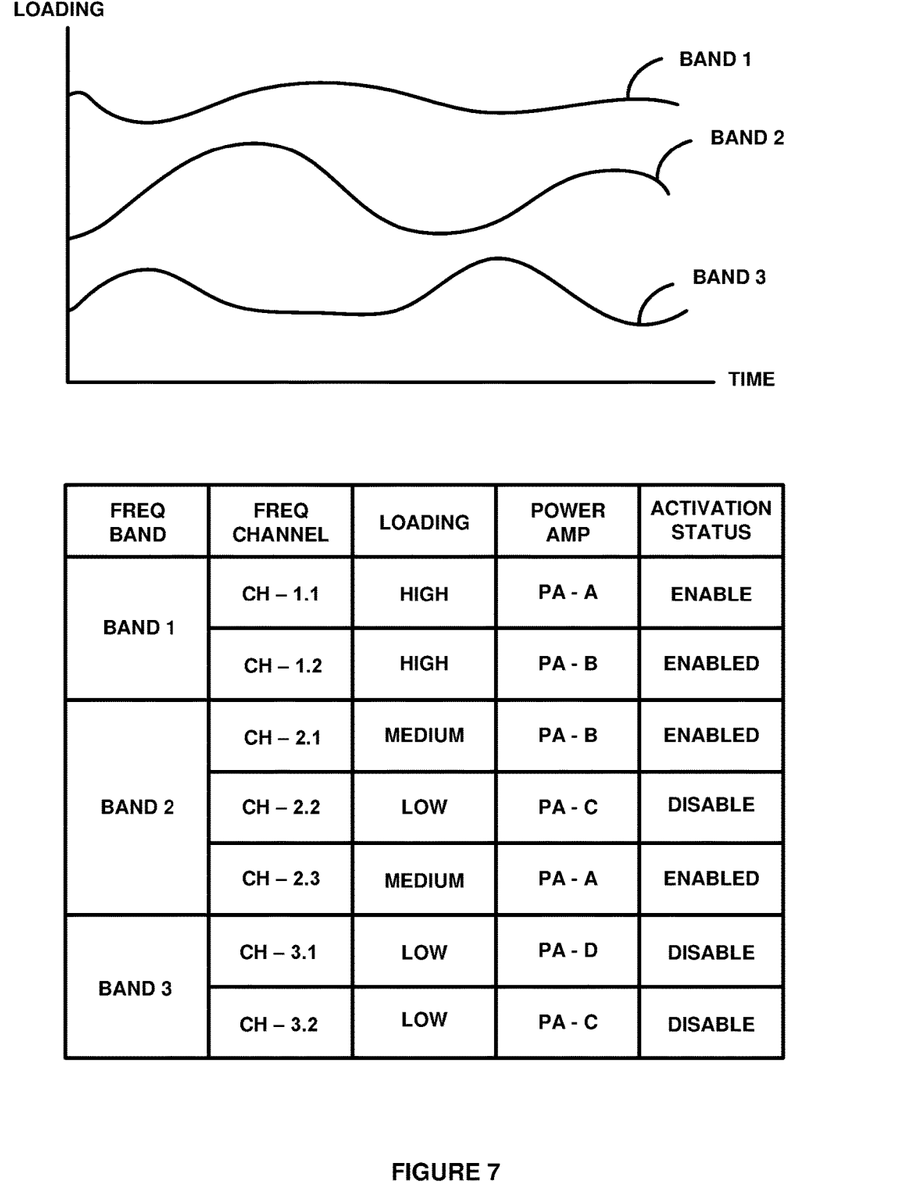
FIG. 7 illustrates a graph and table to dynamically control power amplifiers.

FIG. 7 illustrates a graph and table to dynamically control power amplifiers. Referring to the graph in FIG. 7, the loading levels over time are illustrated for three frequency bands: Band 1, Band 2, and Band 3. As shown, Band 1 consistently has a high loading level. However, Band 2 has a loading level that fluctuates greatly with time. Finally, Band 3 has a consistently low loading level. Referring now to the FIG. 7 table, Band 1 has two channels that are both high in loading level. Band 2 has three channels ranging from low to high loading levels. Band 3 has two channels that are both low in loading level.

Each channel is associated with a power amplifier, such as Power Amplifiers A-D. Based on the loading level for each of the channels, an activation status is associated with each of Power Amplifiers A-D. Since Channel 2.2, Channel 3.1, and Channel 3.2 each have a low loading level, associated Power Amplifier C and Power Amplifier D are instructed to be disabled. Media communications for each of the low level channels will be redirected to a higher level channel.

Figure 8:
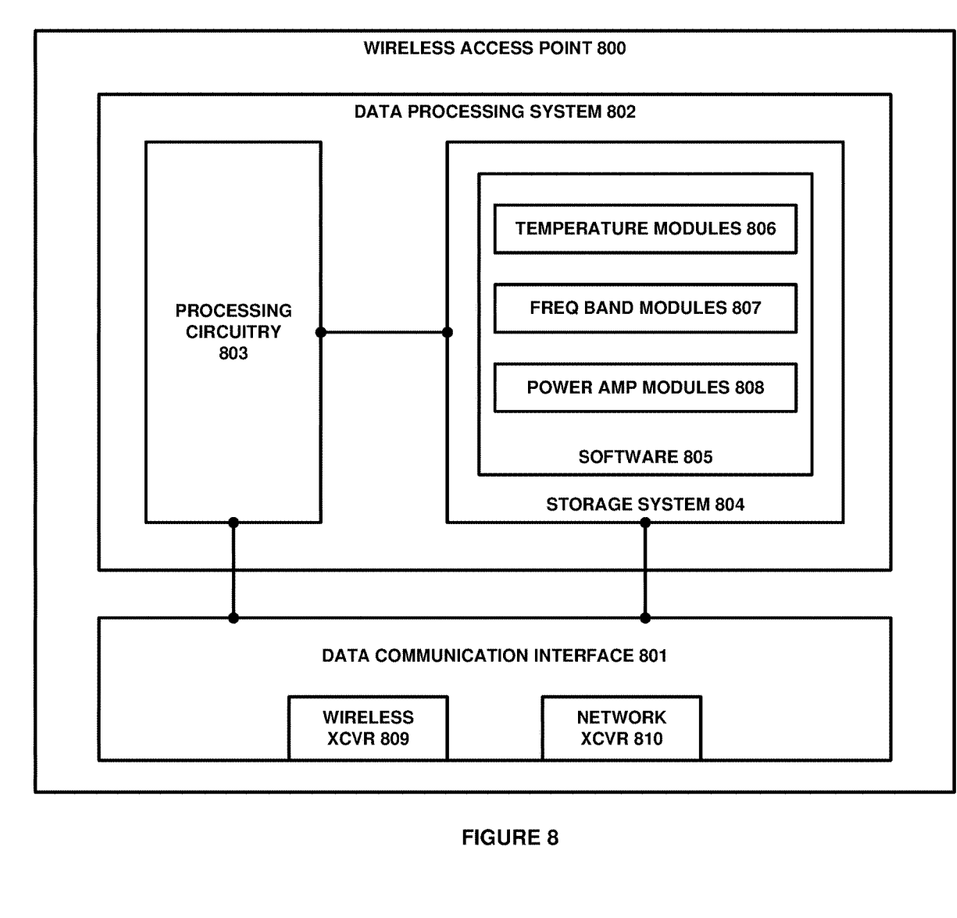
FIG. 8 illustrates a wireless access point to dynamically control power amplifiers.

FIG. 8 illustrates wireless access point 800 to dynamically control power amplifiers. Wireless access point 800 is an example of wireless access point 110, wireless picocell 312, and wireless repeater 600, although wireless access point 110, wireless picocell 312, and wireless repeater 600 may use alternative configurations and operations. Wireless access point 800 comprises data communication interface 801 and data processing system 802. Data communication interface 801 comprises wireless transceiver 809 and network transceiver 810. Data processing system 802 comprises processing circuitry 803 and storage system 804. Storage system 804 stores software 805. Software 805 includes respective software modules 806-808.

Wireless transceiver 809 comprises wireless communication components, such as antennas, amplifiers, filters, modulators, digital signal processors, bus interfaces, memory, software, and the like. Wireless transceiver 809 wirelessly exchanges media communications using a plurality of frequency bands. Network transceiver 810 may comprise wireless and/or wireline communication components, such as ports, bus interfaces, digital signal processors, antennas, amplifiers, filters, modulators, memory, software, and the like.

Processing circuitry 803 comprises server blades, circuit boards, bus interfaces, integrated circuitry, and associated electronics. Storage system 804 comprises non-transitory, machine-readable, data storage media, such as flash drives, disc drives, memory circuitry, data servers, and the like. Software 805 comprises machine-readable instructions that control the operation of processing circuitry 803 when executed. wireless access point 800 may be centralized or distributed. All or portions of software modules 806-808 may be externally stored on one or more storage media, such as circuitry, discs, and the like. Some conventional aspects of wireless access point 800 are omitted for clarity, such as power supplies, enclosures, and the like.

When executed by processing circuitry 803, temperature module 806 directs circuitry 803 to monitor an internal temperature in an enclosure and determine that the internal temperature is above a temperature threshold. When executed by processing circuitry 803, frequency band module 807 directs circuitry 803 to monitor traffic loading on each of the plurality of frequency bands exchanging media communications and select a frequency band with a low traffic level. When executed by processing circuitry 803, frequency band module 807 also directs circuitry 803 to redirect the media communications to a frequency band having a high traffic loading level. When executed by processing circuitry 803, power amplifier module 808 directs circuitry 803 to disable a power amplifier associated with the selected frequency band having the low traffic loading level.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless access point to dynamically control power amplifiers, the method comprising:
   wirelessly exchanging media communications using a plurality of frequency bands;
   monitoring an internal temperature in an enclosure and determining that the internal temperature is above a temperature threshold;
   monitoring traffic loading on each of the plurality of frequency bands exchanging media communications and selecting a frequency band with a low traffic level; and
   redirecting the media communications to a frequency band having a higher traffic loading level and disabling a power amplifier associated with the selected frequency band having the low traffic loading level.

2. The method of claim 1 further comprising:
   monitoring the internal temperature and determining that the internal temperature is below the temperature threshold; and
   enabling the power amplifier associated with the selected frequency band having the low traffic loading level.

3. The method of claim 1 wherein selecting the frequency band with the low traffic level comprises selecting multiple frequency bands with low traffic levels.

4. The method of claim 1 wherein disabling the power amplifier associated with the selected frequency band having the low traffic loading level comprises disabling multiple power amplifiers associated with the selected frequency band having the low traffic loading level.

5. The method of claim 1 wherein:
   selecting the frequency band with the low traffic level comprises selecting a frequency band having a lower propagation characteristic;
   redirecting the media communications to the frequency band having the higher traffic loading level comprises redirecting the media communications to a frequency band having a higher propagation characteristic; and
   disabling the power amplifier associated with the selected frequency band having the low traffic level comprises disabling the power amplifier associated with the selected frequency band having the lower propagation characteristic.

6. The method of claim 1 wherein:
   selecting the frequency band with the low traffic level comprises selecting a frequency band having a lower frequency bandwidth;
   redirecting the media communications to the frequency band having the higher traffic loading level comprises redirecting the media communications to a frequency band having a higher frequency bandwidth; and
   disabling the power amplifier associated with the selected frequency band having the low traffic level comprises disabling the power amplifier associated with the selected frequency band having the lower frequency bandwidth.

7. The method of claim 1 wherein:
   selecting the frequency band with the low traffic level comprises selecting a frequency channel having a low traffic level;
   redirecting the media communications to the frequency band having the higher traffic loading level comprises redirecting the media communications to a frequency channel having a high traffic level; and
   disabling the power amplifier associated with the selected frequency band having the low traffic level comprises disabling the power amplifier associated with the selected frequency channel having the low traffic level.

8. The method of claim 1 wherein:
   selecting the frequency band with the low traffic level comprises selecting a Radio Frequency (RF) transceiver having a low traffic level;
   redirecting the media communications to the frequency band having the higher traffic loading level comprises redirecting the media communications to a frequency band having a high traffic level; and
   disabling the power amplifier associated with the selected frequency band having the low traffic level comprises disabling the power amplifier associated with the selected RF transceiver having the low traffic level.

9. The method of claim 1 wherein the traffic loading on each of the plurality of frequency bands comprises a data bearer loading amount on each of the plurality of frequency bands.

10. The method of claim 1 wherein the wireless access point comprises a wireless picocell.

11. A wireless access point to dynamically control power amplifiers, the wireless access point comprising:
   a wireless transceiver configured to wirelessly exchange media communications using a plurality of frequency bands;
   a processing system configured to monitor an internal temperature in an enclosure and determine that the internal temperature is above a temperature threshold;
   the processing system configured to monitor traffic loading on each of the plurality of frequency bands exchanging media communications and select a frequency band with a low traffic level; and
   the processing system configured to redirect the media communications to a frequency band having a higher traffic loading level and disable a power amplifier associated with the selected frequency band having the low traffic loading level.

12. The wireless access point of claim 11 further comprising:
   the processing system configured to monitor the internal temperature and determine that the internal temperature is below the temperature threshold; and the processing system configured to enable the power amplifier associated with the selected frequency band having the low traffic loading level.

13. The wireless access point of claim 11 wherein the processing system configured to select the frequency band with the low traffic level comprises the processing system configured to select multiple frequency bands with low traffic levels.

14. The wireless access point of claim 11 wherein the processing system configured to disable the power amplifier associated with the selected frequency band having the low traffic loading level comprises the processing system configured to disable multiple power amplifiers associated with the selected frequency band having the low traffic loading level.

15. The wireless access point of claim 11 wherein:
the processing system configured to select the frequency band with the low traffic level comprises the processing system configured to select a frequency band having a lower propagation characteristic;
the processing system configured to redirect the media communications to the frequency band having the higher traffic loading level comprises the processing system configured to redirect the media communications to a frequency band having a higher propagation characteristic; and
the processing system configured to disable the power amplifier associated with the selected frequency band having the low traffic level comprises the processing system configured to disable the power amplifier associated with the selected frequency band having the lower propagation characteristic.

16. The wireless access point of claim 11 wherein:
the processing system configured to select the frequency band with the low traffic level comprises the processing system configured to select a frequency band having a lower frequency bandwidth;
the processing system configured to redirect the media communications to the frequency band having the higher traffic loading level comprises the processing system configured to redirect the media communications to a frequency band having a higher frequency bandwidth; and
the processing system configured to disable the power amplifier associated with the selected frequency band having the low traffic level comprises the processing system configured to disable the power amplifier associated with the selected frequency band having the lower frequency bandwidth.

17. The wireless access point of claim 11 wherein:
the processing system configured to select the frequency band with the low traffic level comprises the processing system configured to select a frequency channel having a low traffic level;
the processing system configured to redirect the media communications to the frequency band having the higher traffic loading level comprises the processing system configured to redirect the media communications to a frequency channel having a high traffic level; and
the processing system configured to disable the power amplifier associated with the selected frequency band having the low traffic level comprises the processing system configured to disable the power amplifier associated with the selected frequency channel having the low traffic level.

18. The wireless access point of claim 11 wherein:
the processing system configured to select the frequency band with the low traffic level comprises the processing system configured to select a Radio Frequency (RF) transceiver having a low traffic level;
the processing system configured to redirect the media communications to the frequency band having the higher traffic loading level comprises the processing system configured to redirect the media communications to a frequency band having a high traffic level; and
the processing system configured to disable the power amplifier associated with the selected frequency band having the low traffic level comprises the processing system configured to disable the power amplifier associated with the selected RF transceiver having the low traffic level.

19. The wireless access point of claim 11 wherein the traffic loading on each of the plurality of frequency bands comprises a data bearer loading amount on each of the plurality of frequency bands.

20. The wireless access point of claim 11 wherein the wireless access point comprises a wireless picocell.

* * * * *